July 14, 1970   J. M. PATTERSON   3,520,123
NUT HARVESTER INCLUDING ROTATABLE SUCTION TUBES
Filed July 11, 1967   11 Sheets-Sheet 1
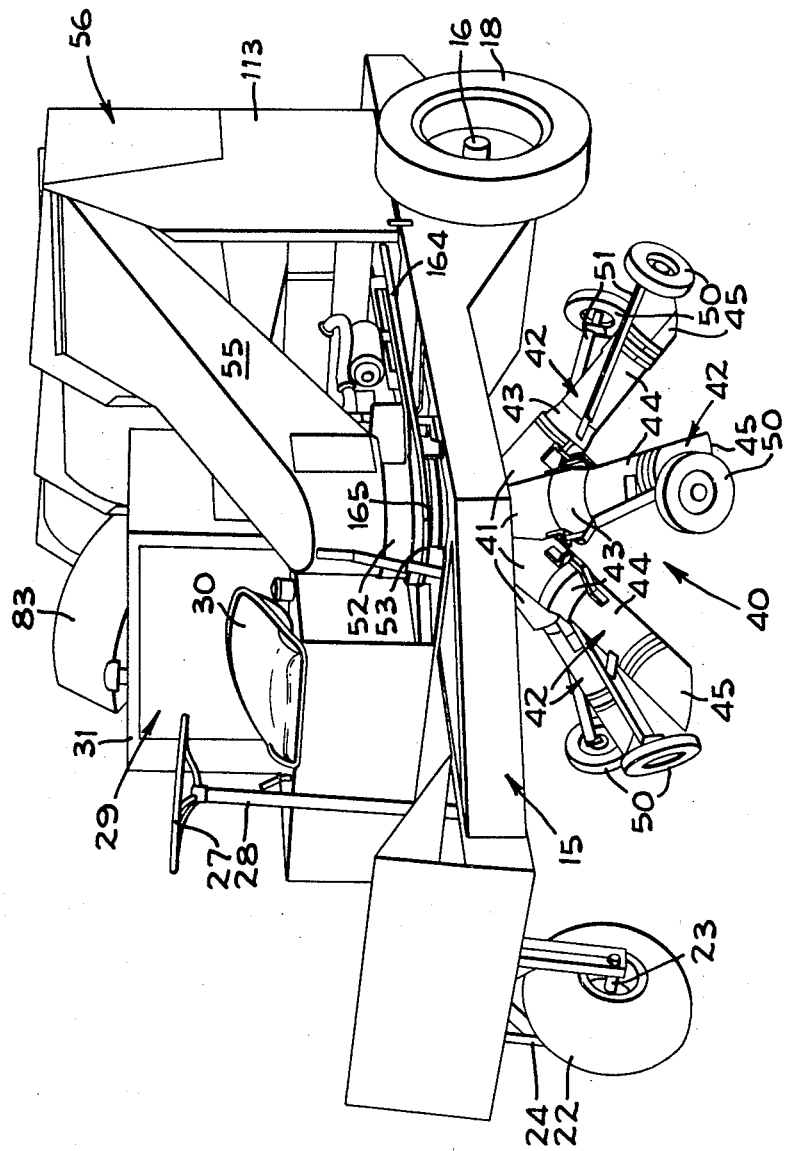
FIG_1
INVENTOR.
JOSEPH M. PATTERSON
BY
Francis W. Anderson
ATTORNEY July 14, 1970 J. M. PATTERSON 3,520,123
NUT HARVESTER INCLUDING ROTATABLE SUCTION TUBES
Filed July 11, 1967 11 Sheets-Sheet 2
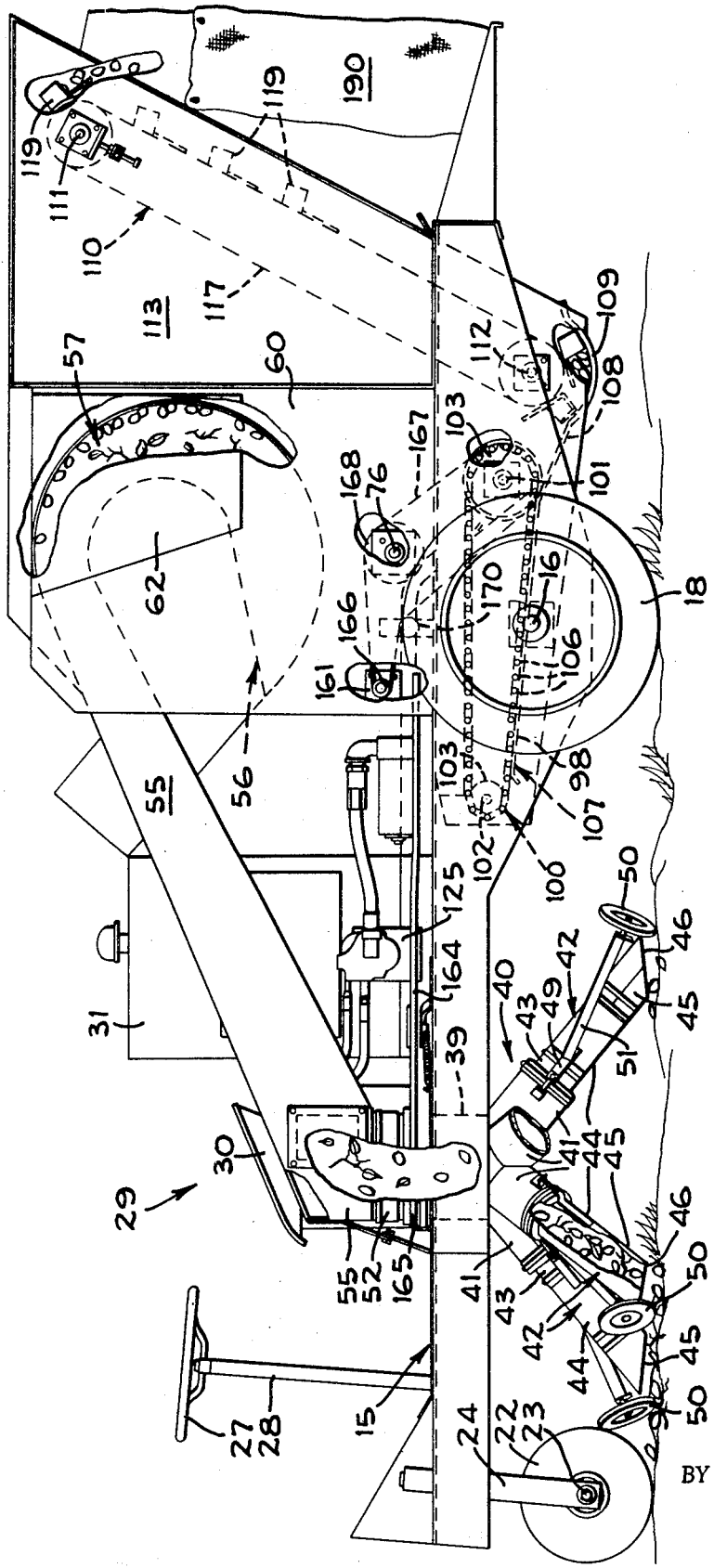
FIG_2
INVENTOR.
JOSEPH M. PATTERSON
BY
Francis W. Anderson
ATTORNEY

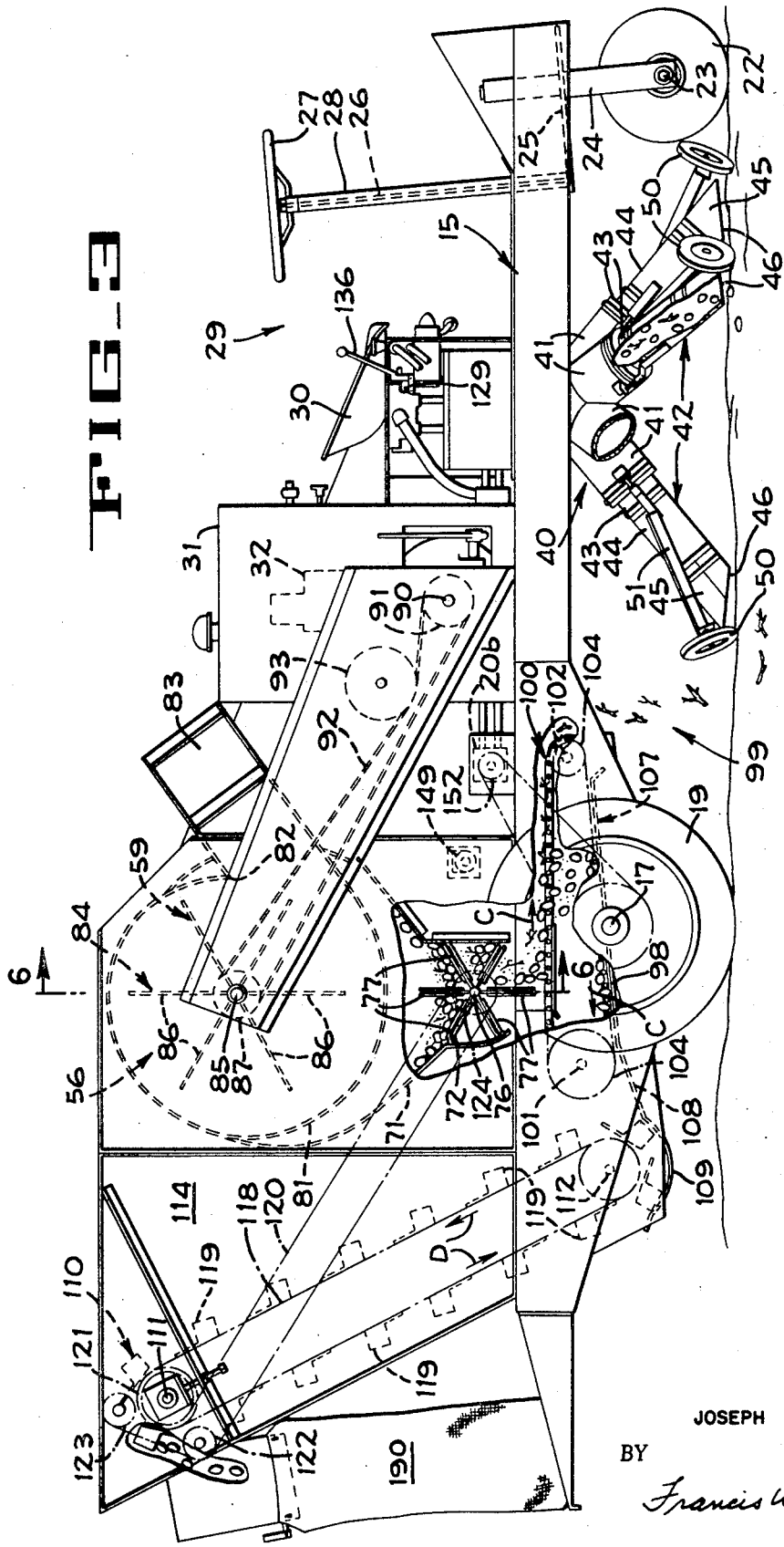

July 14, 1970  J. M. PATTERSON  3,520,123
NUT HARVESTER INCLUDING ROTATABLE SUCTION TUBES
Filed July 11, 1967  11 Sheets-Sheet 4
FIG_4
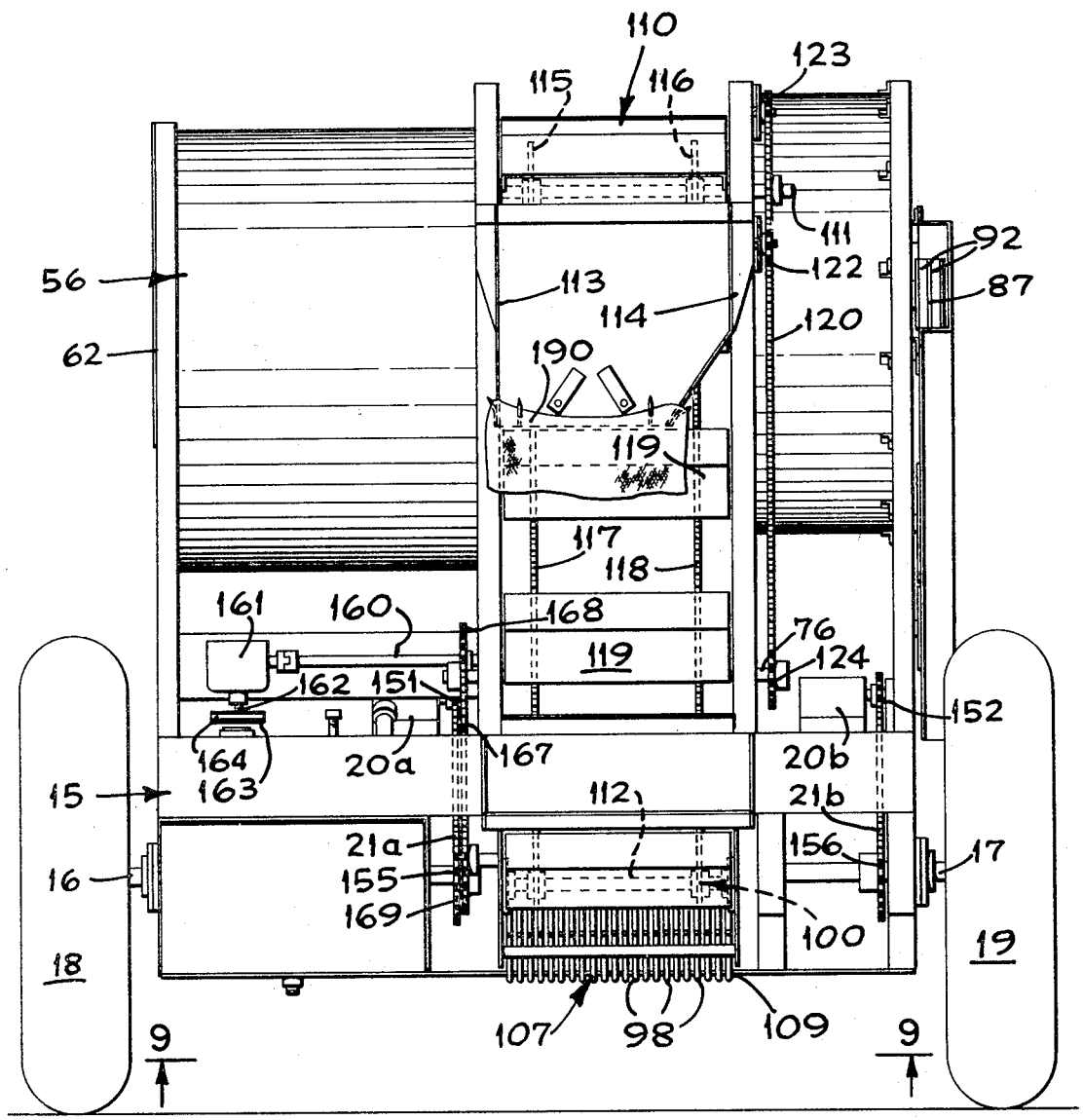
INVENTOR.
JOSEPH M. PATTERSON
BY
Francis W. Anderson
ATTORNEY

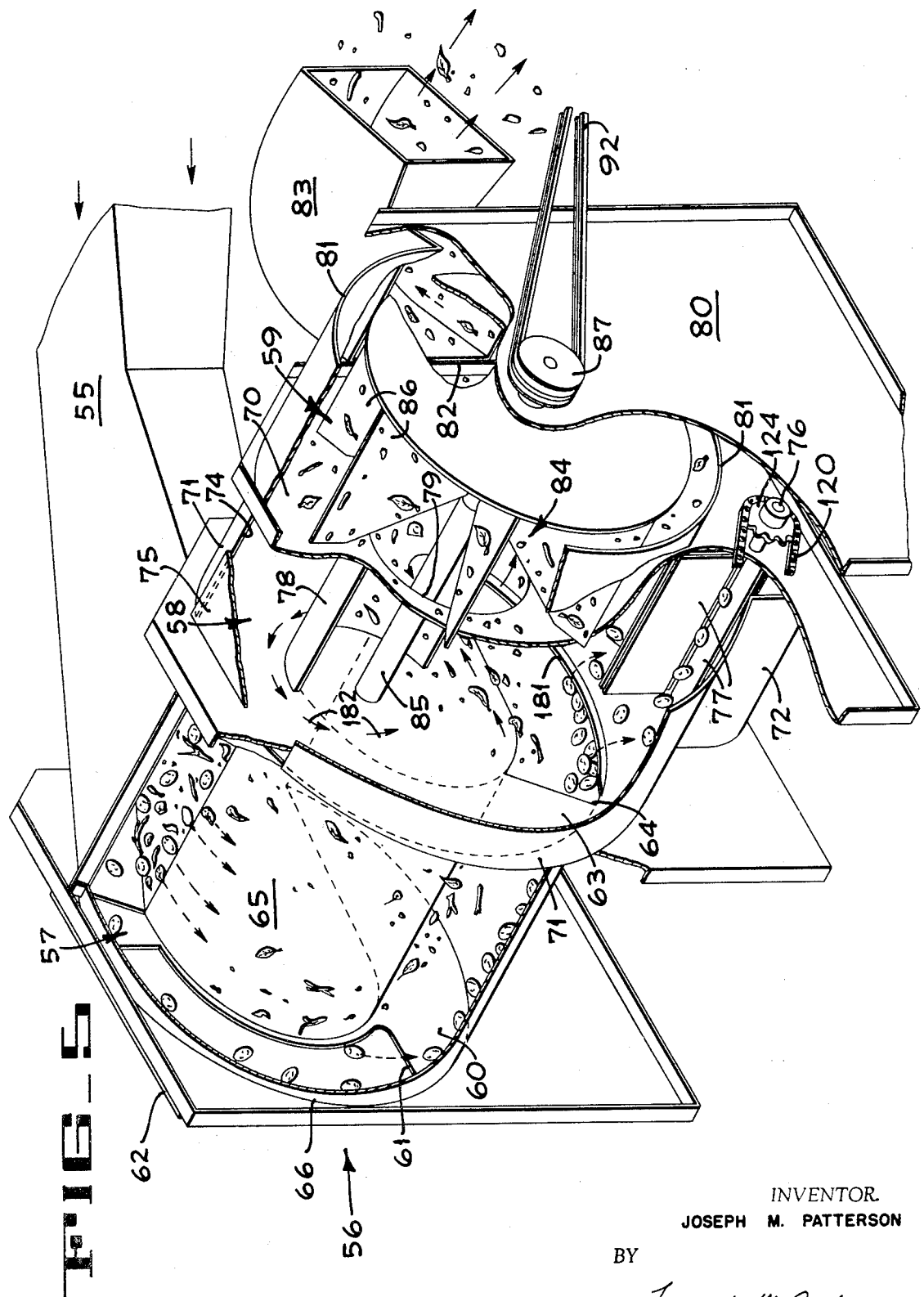

July 14, 1970  J. M. PATTERSON  3,520,123
NUT HARVESTER INCLUDING ROTATABLE SUCTION TUBES
Filed July 11, 1967  11 Sheets-Sheet 6
FIG_6
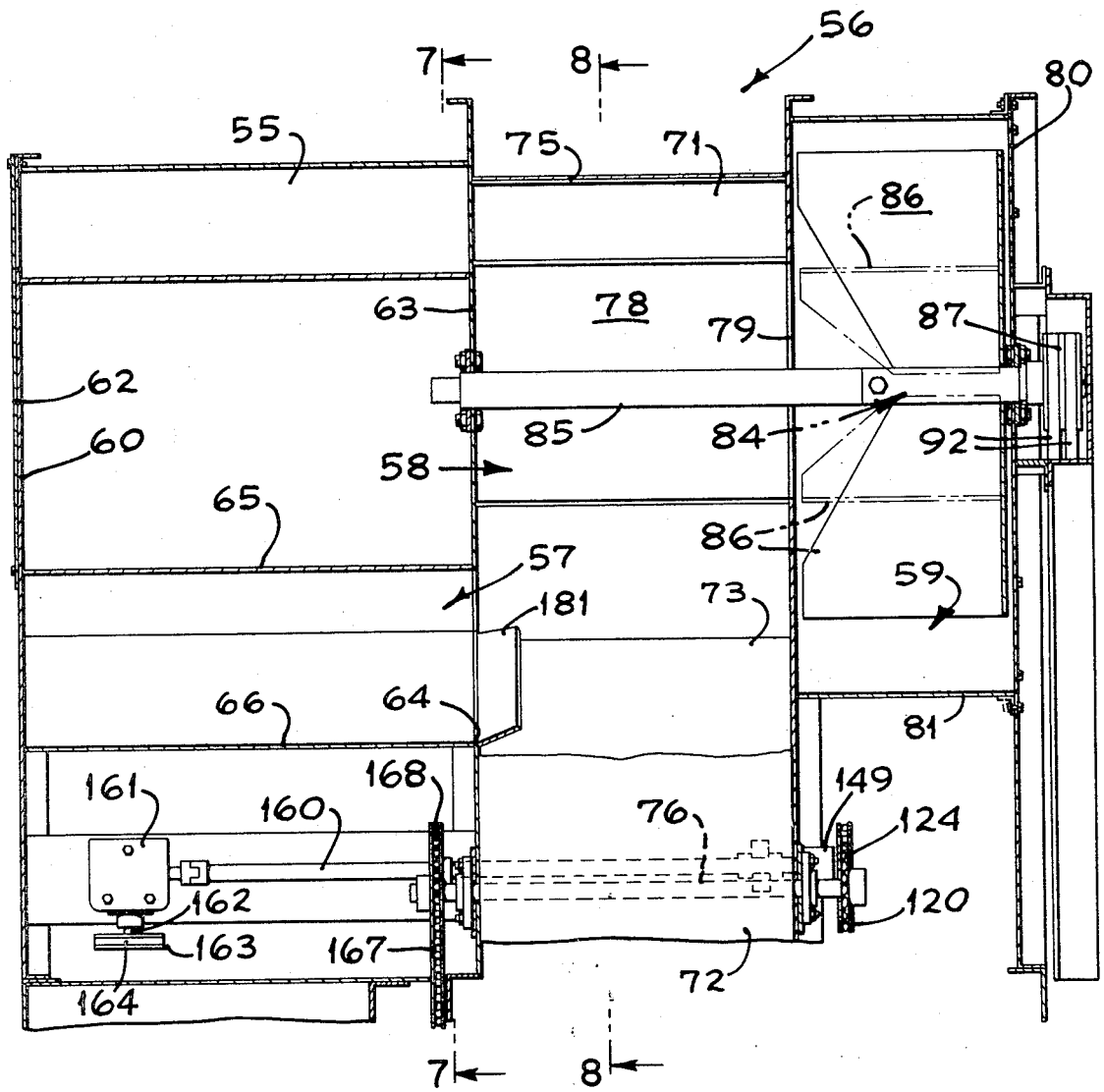
INVENTOR.
JOSEPH M. PATTERSON
BY
Francis W. Anderson
ATTORNEY July 14, 1970  J. M. PATTERSON  3,520,123
NUT HARVESTER INCLUDING ROTATABLE SUCTION TUBES
Filed July 11, 1967  11 Sheets-Sheet 7
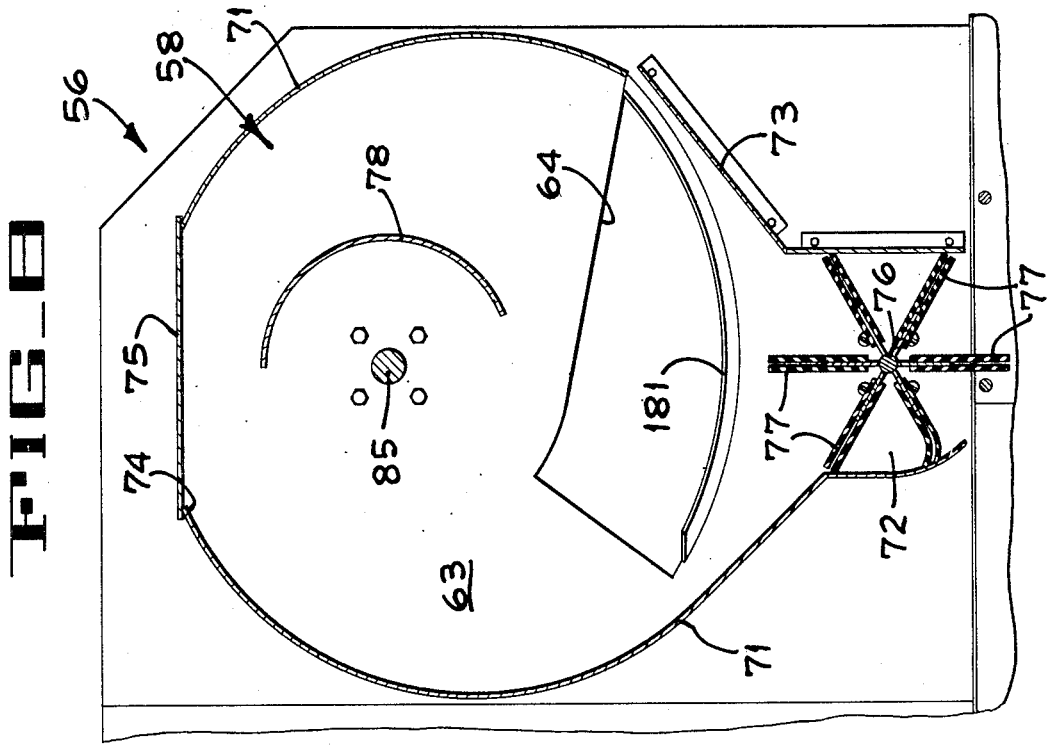
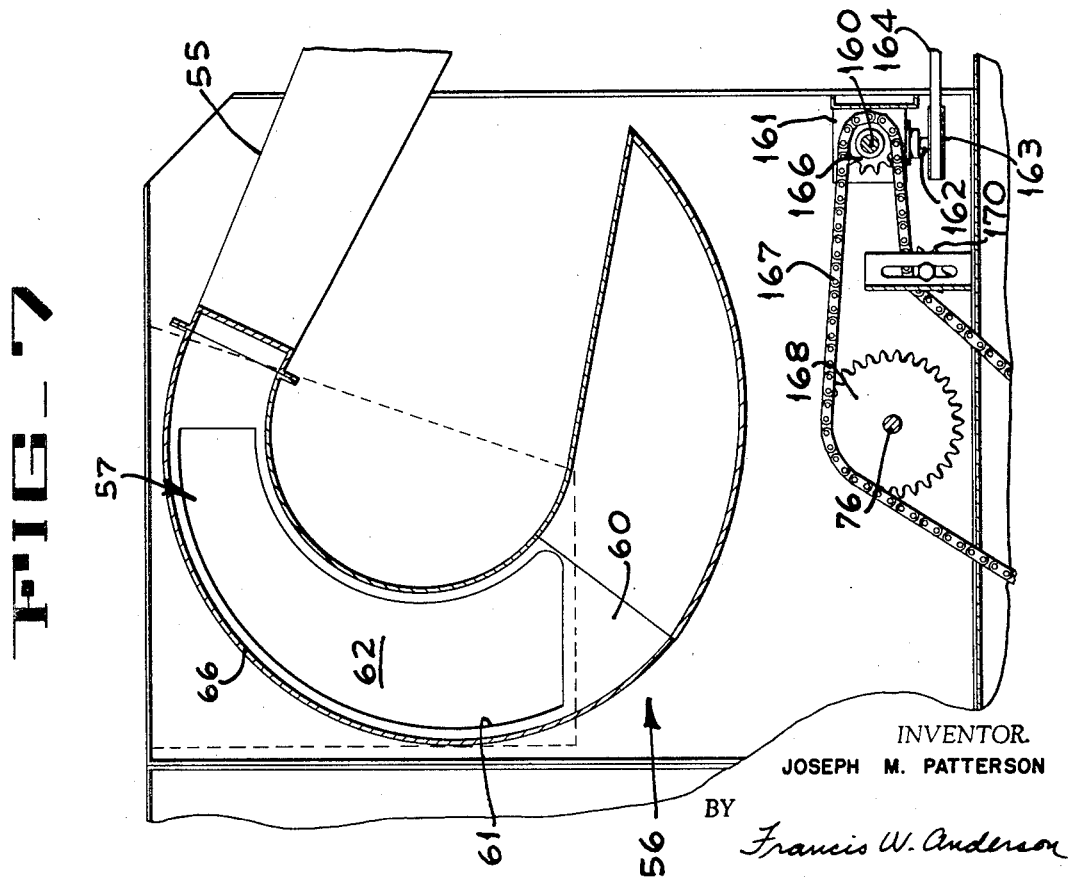
INVENTOR.
JOSEPH M. PATTERSON
BY
Francis W. Anderson
ATTORNEY

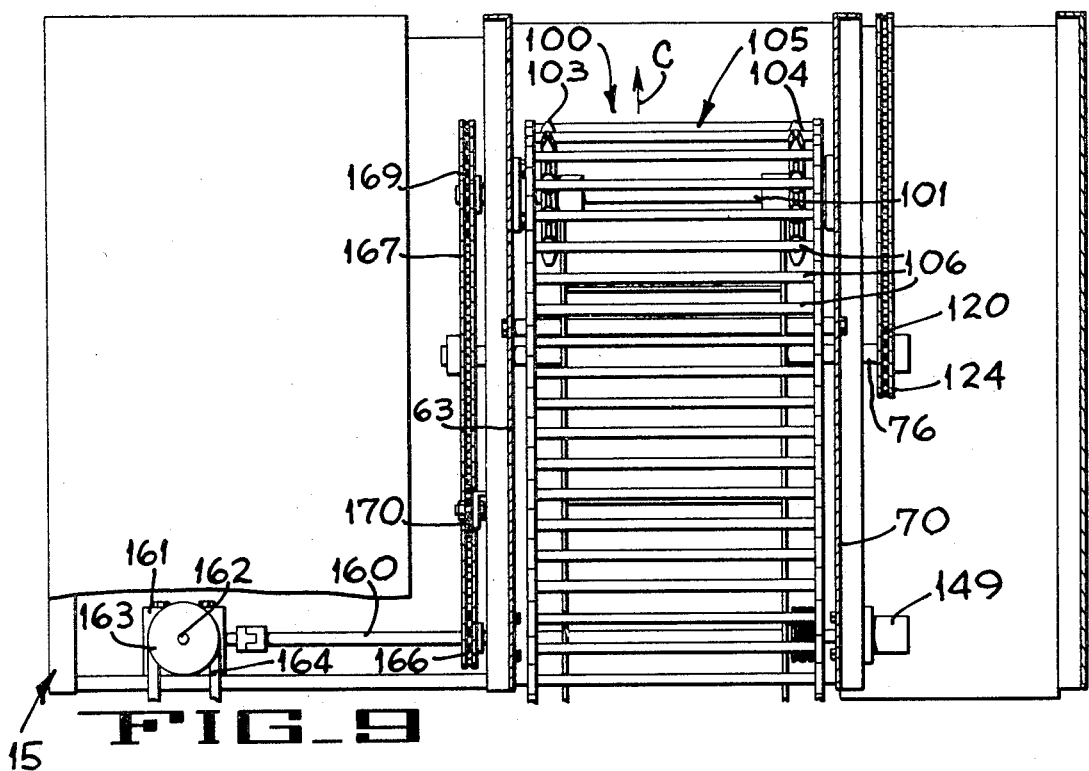
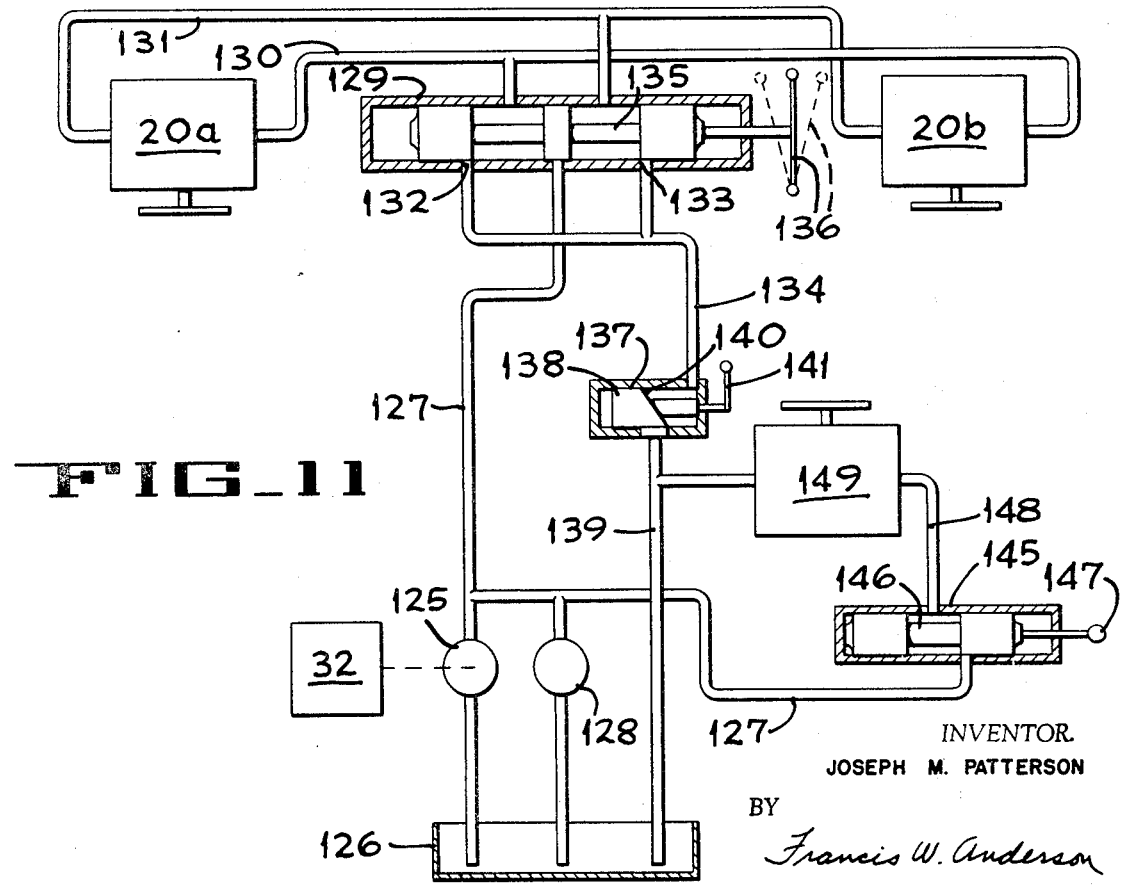

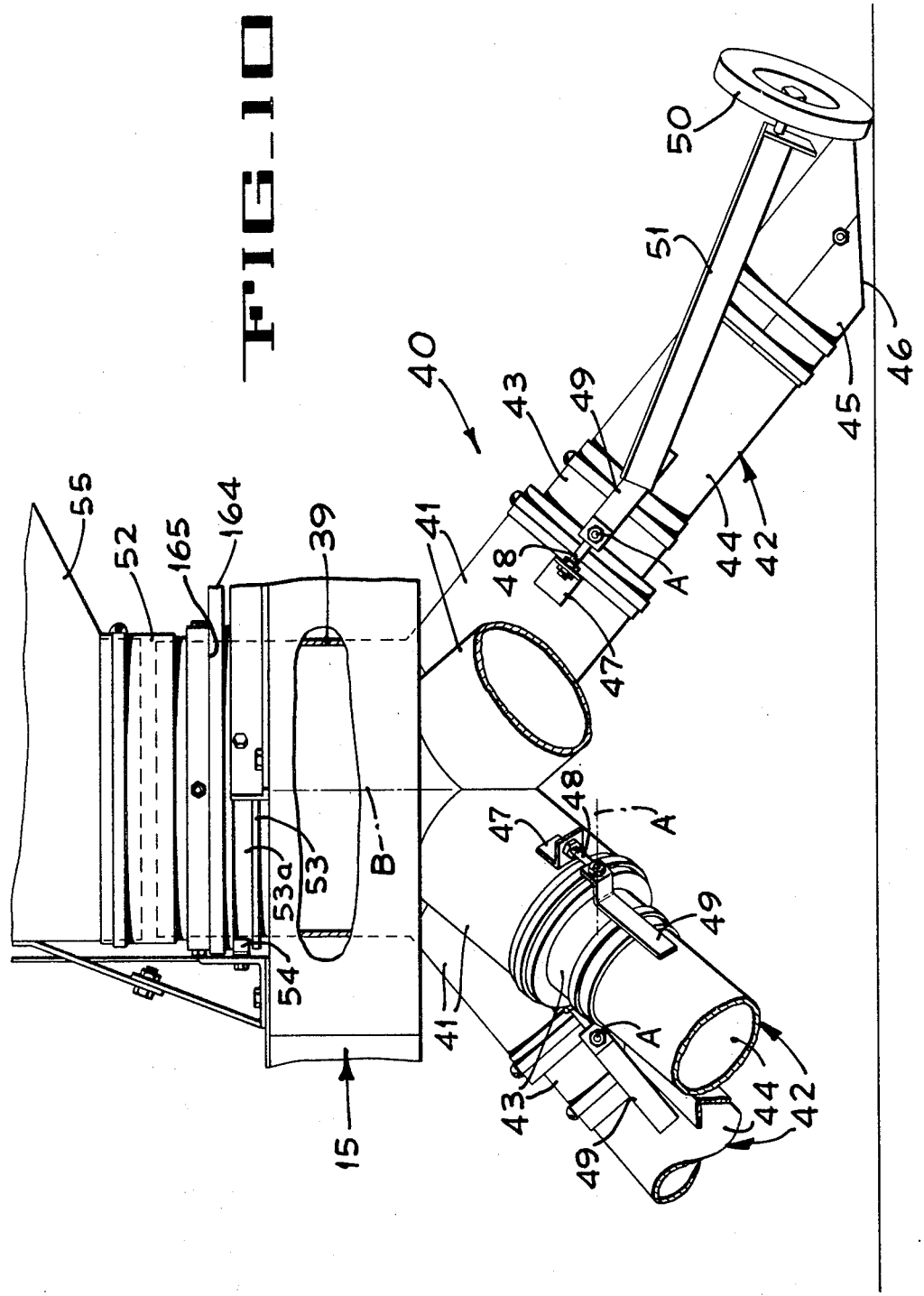

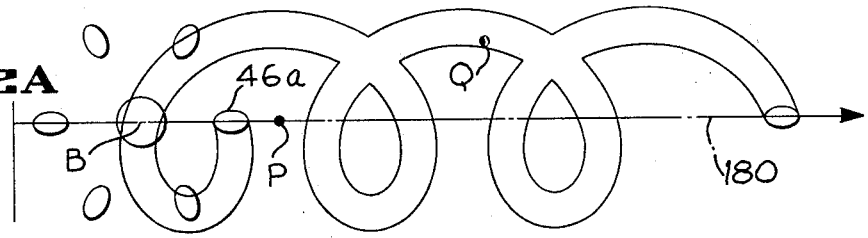
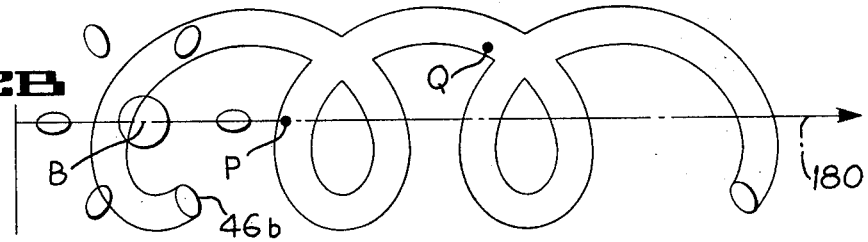
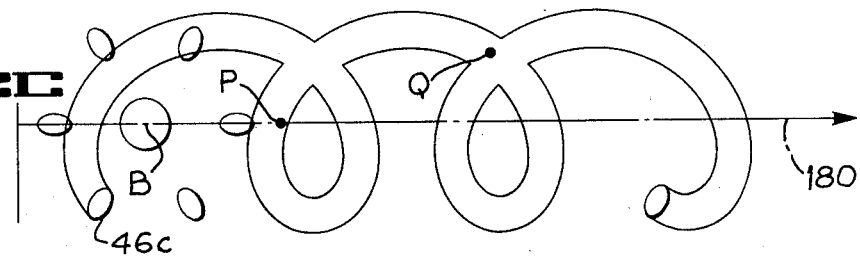
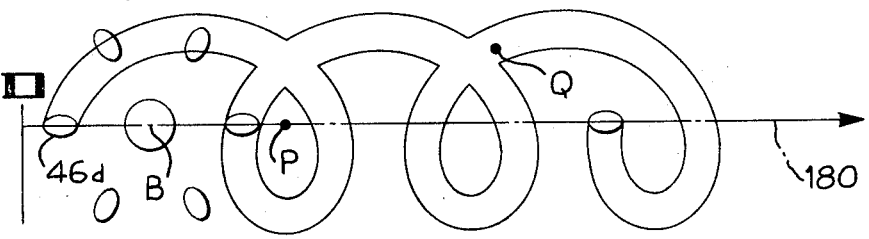
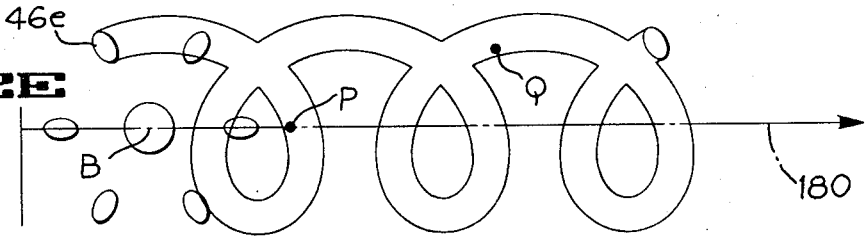
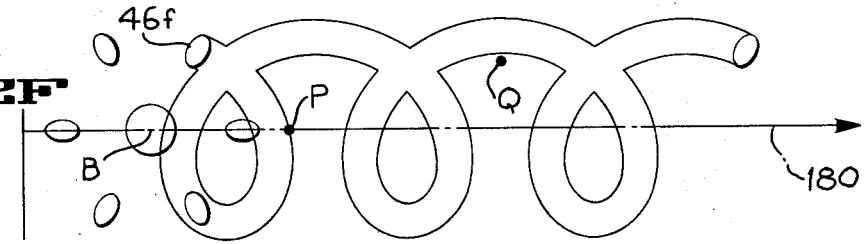

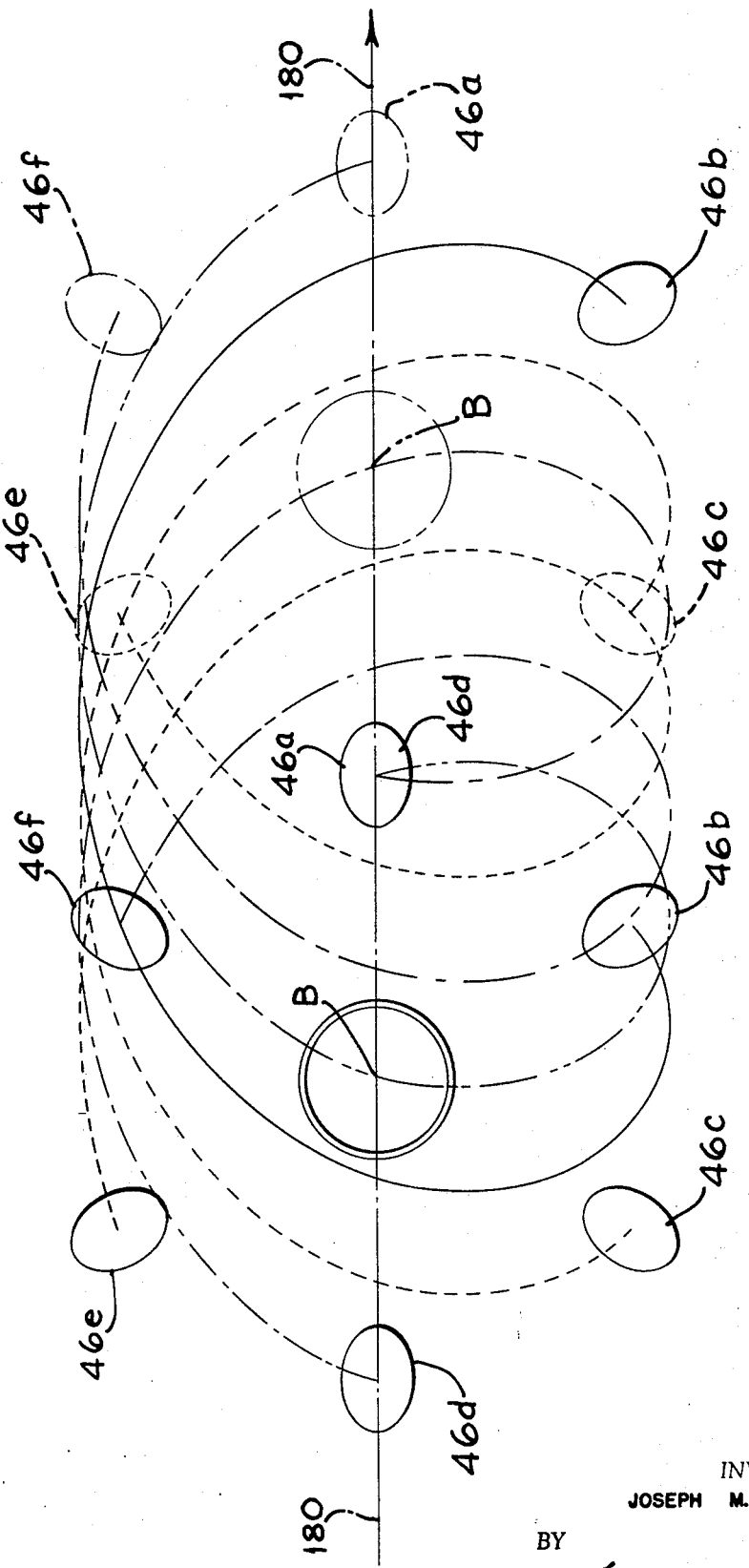

United States Patent Office 3,520,123
Patented July 14, 1970

3,520,123
NUT HARVESTER INCLUDING ROTATABLE SUCTION TUBES
Joseph M. Patterson, Winter Park, Fla., assignor to FMC Corporation, San Jose, Calif., a corporation of Delaware
Filed July 11, 1967, Ser. No. 652,506
Int. Cl. A01g *19/00*
U.S. Cl. 56—328                                       6 Claims

ABSTRACT OF THE DISCLOSURE

A nut harvesting machine, which moves along the ground, has a rotor with a plurality of suction tubes extending downwardly and outwardly therefrom. The tubes are vertically movable, and the ends thereof, which move in orbital paths, are maintained closely spaced from the ground by gage wheels. A centrifugal blower draws nuts and debris through the suction tubes, rotor, and a suction duct. A centrifugal chamber and a vortex chamber between the duct and the blower separates the light debris from the nuts and heavy debris, which fall through a rotary vacuum sealing valve to a conveyor. The conveyor has an upper run which moves larger debris in one direction and has a lower run which moves the nuts and small debris on a grate in the opposite direction. The grate passes the small debris, and the nuts are carried from the grate by an elevator to a receptacle.

BACKGROUND OF THE INVENTION

The present invention relates to a machine for gathering randomly dispersed articles, such as nuts, from the ground.

One of the problems in gathering small articles from the ground is the difficulty of grasping the articles because of their size. A method used heretofore, with some success, has been to pick the articles up by suction.

In a suction system having a power unit of given size, the force tending to lift the nut or other article from the ground will depend on the size of the suction opening. In general, the wider the opening, the weaker the suction force at the opening. Conversely, in a suction system with a small opening, greater suction can be produced at the opening to exert a greater lifting force on the nut.

In the conventional pneumatic nut harvester, the span of the suction opening determines the width of the swath taken through the nuts on each pass of the machine, and each nut is exposed to the suction opening once on each pass. Generally, therefore, with a conventional pneumatic nut harvester, the wider the suction opening, and the wider the swath taken, the weaker the suction and the smaller the percentage of nuts picked up. On the other hand, a small suction opening will produce a small swath through the nuts, but a higher percentage of nuts will be gathered. With smaller swaths, a larger number of passes will be required to cover the same area.

SUMMARY OF THE INVENTION

In the machine of the present invention, a relatively wide swath is taken on each pass of the machine, and a high percentage of nuts, or articles, encountered can be gathered on each pass. In brief, in the preferred form of the invention, a rotor mounted in the machine has a plurality of suction tubes extending downwardly and outwardly therefrom. The tubes, which are vertically movable, are supported at their outer ends by gage wheels which maintain the outer ends of the suction tubes in closely spaced relation to the ground, even over uneven terrain. As the machine moves along a longitudinal path, the rotation of the rotor moves the ends of the suction tubes in different orbital paths (with respect to the ground) about the axis of the rotor.

The suction system of the machine has a centrifugal blower at one end which expels air from a blower chamber. The blower draws air through the system from the outer openings of the suction tubes at the other end of the system. The air drawn in the suction tubes, which carries the nuts and debris, passes through the rotor and through a suction duct to a centrifugal chamber where the nuts and heavier debris are separated from the light debris. The nuts and heavier debris fall through a rotary vacuum sealing valve to a conveyor outside the suction system, and the lighter debris is drawn in a helical path inside the suction system through a vortex chamber into the blower chamber where the light debris is expelled with the exhaust air.

On the conveyor outside the suction system, the nuts and smaller debris fall through the upper run of the endless web of the conveyor to a grate to be carried in one direction by the lower run of the conveyor, while the larger debris is carried away in the opposite direction by the upper run of the conveyor. The grate retains the nuts but passes the smaller degris. The nuts are scooped off the grate by elevator buckets which dump the nuts into a bag.

The spaced apart suction openings of the suction tubes have a total area which is not large in view of the width of the swath made by the orbiting suction tubes. More importantly, however, the suction opening of each tube crosses the longitudinal path of the machine twice on each revolution of the rotor, and the suction openings therefore provide multiple exposure of the nuts to suction on each pass of the machine. Moreover, the different orbital paths of the ends of the suction tubes overlap to provide even more thorough coverage of the swath on each pass.

It is therefore one object of the present invention to provide a machine for suction gathering of articles which provides a thorough coverage of a relatively wide swath. It is another object of the present invention to provide a nut harvesting machine with multiple coverage of a given area on a single pass. It is yet another object of the present invention to provide a nut harvester which has multiple suction openings movable in overlapping paths across the ground. It is still another object of the present invention to provide a nut harvesting machine with multiple suction openings each maintained a predetermined distance above the ground even on uneven terrain. It is a further object of the present invention to separate articles, such as nuts, from debris gathered therewith.

BRIEF DESCRIPTION OF THE DRAWINGS

FIG. 1 is a view in perspective of the machine of the present invention;
FIG. 2 is an elevational view showing the left side of the machine;
FIG. 3 is an elevational view showing the right side of the machine;
FIG. 4 is an elevational view showing the rear of the machine;
FIG. 5 is a view in perspective showing a part of the suction system of the machine;
FIG. 6 is a view taken on the lines 6—6 of FIG. 3;
FIG. 7 is a view taken on the lines 7—7 of FIG. 6;
FIG. 8 is a view taken on the lines 8—8 of FIG. 6;
FIG. 9 is a view taken on the lines 9—9 of FIG. 4;
FIG. 10 is an enlarged view, taken as the view of FIG. 2, of the rotor;
FIG. 11 is a schematic diagram of the hydraulic system of the machine of FIG. 1;
FIGS. 12A to 12F show the orbital paths, respectively, of each suction opening individually with respect to a common linear longitudinal path; and FIG. 13 shows the orbital paths of all suction openings collectively with respect to a single linear longitudinal path.

DESCRIPTION OF THE PREFERRED EMBODIMENT

The nut harvesting machine of the present invention has a frame 15 in which a pair of axially aligned axles 16 16 and 17 (FIG. 4) are journaled. Each axle extends outboard of the frame 15 and each has a rear wheel, 18, 19, mounted thereon. Two hydraulic motors 20a, 20b are mounted on the frame and connected, respectively, to the wheels 18 and 19 by drive trains which include drive chains 21a, 21b, respectively. A single front wheel 22 (FIG. 1) is mounted on an axle 23 which is journaled in fork 24. The fork 24 is rotatably mounted in the frame and is connected by chain 25 (FIG. 3) to a steering shaft 26. The steering shaft 26, which has a steering wheel 27 secured at the upper end, is received in a steering column 28 secured to the frame of the machine in the operator's cab, indicated generally at 29. A seat 30 is provided for the operator in the cab, and the housing 31 of an internal combustion engine 32 is mounted on the frame immediately behind the operator's cab.

A rotor 40 (FIGS. 2, 10) journaled in frame 15 has a hollow cylindrical body portion 39 with six rigid tubular sections 41 depending therefrom. Six suction members, or tubes, 42, which are connected, respectively, to the tubular sections 41 by flexible boots 43, extend downwardly and outwardly from the rotor. Each suction tube comprises a rigid sleeve portion 44 and a nozzle portion 45. Nozzle 45 is flexible and may be made of rubber, for example, to avoid damage caused by rocks or other obstructions. Each of the six nozzles terminate on a generally horizontal plane (when the machine is on level ground) to define six suction openings 46a, 46b, 46c, 46d, 46e, and 46f (FIG. 13) parallel to the ground.

A pair of diametrically opposed brackets 47 (FIG. 10) are mounted on each tubular section 41 of the rotor. Tie rods 48, secured to each bracket, are pivotally connected on axis A to braces 49 which are secured to each side of the rigid sleeve portions 44 of the suction tubes. The flexible boot 43, which may, for example, be made of rubber, and the pivotal connection between tie rods 48 and braces 49, permit the suction tubes to pivot about axis A with respect to the rotor. Thus, the suction tubes, and the suction openings thereof, can move vertically.

On each suction tube, a gage wheel 50 (FIGS. 1 and 10) has an axle 51 secured to one of the braces 49. The gage wheel, which is oriented generally tangential to a circle about the central axis B of rotation of the rotor, maintains the suction opening 46 at a predetermined height above the ground. Preferably, the suction tube is maintained just high enough to clear the nuts so that the suction opening will be as close as possible to the nuts.

To upper end of the body 39 of rotor 40 is rotatably received in a sleeve 52 (FIG. 2) secured to the lower end of a suction duct 55. A ring 53 (FIG. 10), connected to the rotor, has a track 53a therein which receives a plurality of rollers 54 mounted on the frame around the rotor. Suction duct 55 is secured to the frame and slopes upwardly from the rotor. The upper end of the suction duct 55 is connected to separating mechanism 56 as shown in FIG. 5. The separating mechanism 56 is made up of three chambers: an entry, or centrifugal, chamber 57 at the upstream side of the separating mechanism, an intermediate, or vortex, chamber 58 in the middle of the separating mechanism, and a blower chamber 59 at the downstream side of the separating mechanism.

The entry chamber 57, into which the duct 55 leads, has an outer side wall 60 with an access opening 61 therein as shown in FIGS. 5 and 7. The access opening 61, which is covered during operation of the harvester by removable panel 62, permits cleaning of the chamber 57. The other side wall 63 of chamber 57, which separates that chamber from intermediate chamber 58, has an opening 64.

A pair of spaced apart curved plates 65 and 66 extend between the side walls 60, 63 of chamber 57 and define the front and rear walls of the chamber 57. Thus, the chamber 57 defines a scroll-shaped passage extending from the end of duct 55 to the opening 64 which leads into intermediate chamber 58.

The intermediate chamber 58, which has side wall 63 and opposite side wall 70, is defined in part by the curved scroll-shaped plate 71 extending between the side walls 63 and 70 as shown in FIGS. 5 and 8. Plate 71 extends from the right end of opening 64 (as viewed in FIG. 8) around to a rotary vacuum sealing valve, indicated generally at 72, which is located below the opening 64. Another plate 73, bent in the middle and extending between the side walls 63 and 70, also forms a part of chamber 58. An access opening 74 in plate 71 is covered during operation of the machine by removable panel 75. A shaft 76 of valve 72, journaled in side walls 63 and 70, has six radial paddles 77 extending across the chamber 58. The outer ends of each paddle are flexible and, as the shaft 76 rotates, there is always at least one paddle engaged with plate 71, and at least one paddle engaged with plate 73. Thus a vacuum can be maintained in the chamber 58, defined by side walls 63 and 70, plates 71 and 73, and panel 75, at the same time that the valve shaft is rotating to pass articles entrained between the paddles from the valve. A curved baffle plate 78 is mounted in chamber 58 and extends across the chamber.

The blower chamber 59 has inner side wall 70, with a central opening 79, and a removable outer side wall 80, as shown in FIGS. 3 and 5. A curved plate 81 is formed in cylindrical conformation except for a rear opening 82 to which a discharge duct 83 is connected. The plate 81 extends between the walls 70 and 80 to define the blower chamber which receives a fan, indicated generally at 84, therein. A shaft 85, which extends through chambers 58 and 59, is journaled in walls 63, 70 and 80. Within chamber 59, six fan blades 86 are connected to the shaft and extend radially therefrom. A sheave 87 is connected to shaft 85 outside the separating mechanism 56.

The engine 32 has a power take-off shaft 90 which has a sheave 91 mounted theeron. Endless belts 92 received over sheaves 91 and 87, drive the blower fan 84. An idler pulley 93 is adjustably mounted on the engine housing 31 to maintain the belts 92 taut.

A conveyor 100 has two shafts 101, 102 journaled in the frame 15 (see FIGS. 2, 3 and 9). Each shaft has two spaced apart sprockets (103, 104, respectively) to receive an endless web 105. The web 105 comprises parallel, spaced, rods 106 extending transverse to the direction of travel (indicated by arrows C) of the web. Each rod 106 is linked to an adjacent rod at both ends. The conveyor 100 is positioned under the rotary sealing valve 72, and nuts and debris passing through the valve drop on the top run of endless web 105. The rods 106 are spaced far enough apart to pass the nuts (and smaller debris) which drop through the top and bottom run of the web 105 to a grate 107 immediately under the bottom run. Twigs and other debris, indicated at 99, which are too large to pass through the upper run of the conveyor, are transported to the right (as viewed in FIG. 3) by the upper run of the conveyor and fall to the ground. The lower run of the conveyor engages the nuts on grate 107 which is made of spaced rods 98 extending in the direction of travel of the lower run of the conveyor 100. The small debris falls through the grate while the nuts move to the left to the ramp 108. The nuts slide down the ramp to a shallow well 109 in grate 107.

An elevator 110, as shown in FIGS. 2, 3 and 4, has two shafts 111 and 112 journaled in two parallel upstanding walls 113, 114 connected to the frame 15. Each shaft has a pair of spaced sprockets 115, 116 thereon. Two endless chains 117, 118 received on the sprockets and extend between the shafts 111 and 112. A plurality of buckets 119, received between walls 113, 114, are connected across the chains 117, 118 and, as the chains rotate, the buckets scoop nuts out of well 109 which is curved to follow the path of the buckets. As the chain rotates in the direction indicated by arrows D, the buckets are turned upside down when they pass over the upper sprockets of the elevator. A receptacle, which may, for example, be a conveyor (not shown) or a bag, such as bag 190, is positioned below the point where the buckets turn over to catch the nuts falling from the bucket. As shown in FIGS. 3 and 4, chains 117, 118 are rotated through a sprocket 121 mounted on shaft 111. An endless chain 120, received over two idler sprockets 122, 123 connected to wall 114, engages drive sprockets 121. The chain 120 is received over a sprocket 124 mounted on shaft 76 of rotary sealing valve 72.

As shown in FIGS. 2 and 11, a hydraulic pump 125 is connected to engine 32 and is driven thereby to take hydraulic fluid from sump 126 and deliver it under pressure to pressure line 127. A relief valve 128 is connected between pressure line 127 and sump 126 to limit the pressure in line 127. Pressure line 127 is connected to the pressure port of a reversing valve 129. Valve 129 has two motor ports connected respectively to motor lines 130, 131. Motor line 130 is connected to one side of both wheel motors 20a and 20b, and line 131 is connected to the opposite sides of the wheel motors. Valve 129 has two discharge ports 132, 133 connected to return line 134. The valve 129 has a movable valve member 135 which can be shifted either to the left or right of the position shown by the manually operated lever 136. The valve 129 is mounted in the operator's cab 29. When the operator shifts the lever 136 forward, to shift valve member 135 to the right (as viewed in FIG. 11), fluid under pressure passes from line 127, through the valve, to motor line 130. This pressure fluid passes through the wheel motors, to drive the machine forward, and returns from the motors by line 131, passing through valve 129, out port 133 to return line 134. Conversely, when the operator shifts the lever 136 rearward, to shift valve member 135 to the left (as viewed in FIG. 11), fluid under pressure passes from line 127, through the valve, to motor line 131. This pressure fluid passes through the wheel motors, to drive the machine rearwardly, and returns from the motors by line 130, passing through valve 129, out port 132 to return line 134.

The rate at which the hydraulic wheel motors turn, and hence the speed of the harvesting machine, is determined by the setting of hydraulic throttle valve 137. When the rotatable valve member 138 is in the position shown in FIG. 11, no fluid can pass from line 134 to discharge line 139 and the sump 126, so no fluid can flow through the wheel motors. When valve member 138, which has a sloping face 140, is rotated by handle 141, fluid can flow through the valve at a rate determined by the extent of rotation of valve member 138. Thus, the wheel motors can rotate, and drive the harvester, at a speed determined by the angular setting of valve handle 141.

Pressure line 127 is connected to an inlet port of blocking valve 145. Valve 145 has a shiftable valve member 146 which, when in the position shown in FIG. 11, blocks the flow of hydraulic fluid through the valve. When the valve member 146 is shifted to the right (as viewed in FIG. 11) by handle 147, fluid can flow through the valve from the inlet port to the outlet port which is connected to motor line 148. Fluid flowing through line 148 rotates the auxiliary equipment hydraulic motor 149, and passes therethrough into the discharge line 139 and the sump.

The wheel motors 20a and 20b are mounted on the frame and have sprockets 151 and 152 which receive, respectively, endless chains 21a and 21b. The chains 21a and 21b are received on sprockets 155 and 156 connected, respectively, to axles 16 and 17. The auxiliary equipment motor 149, as shown best in FIG. 9, is mounted on wall 70 and is coupled to a shaft 160 extending through walls 70 and 63. Shaft 160 is engaged with the input shaft of gearbox 161, which has an output shaft 162. A pulley 163 is mounted on output shaft 162 and receives an endless belt 164. Belt 164 is received in groove 165 of ring 53 on rotor 40, as shown in FIGS. 2 and 10, to rotate the rotor by means of the drive train defined by hydraulic motor 149, shaft 160, gearbox 161, shaft 162, pulley 163, and belt 164. A sprocket 166 on shaft 160 receives chain 167.

The shaft 76 of valve 72, in addition to the sprocket 124 which drives the elevator, has a sprocket 168 mounted thereon, shown in FIG. 2, which receives chain 167. The shaft 101 of conveyor 100 has a sprocket 169 thereon which also receives chain 167. Chain 167 is also engaged with idler sprocket 170 which is adjustably mounted on the frame. Thus, the endless web 105 of conveyor 100 is continuously driven through the drive train defined by shaft 149, shaft 160, sprocket 165, chain 167, sprocket 168, and sprocket 169. It will be noted that the rotary valve is continuously driven by chain 167 to continuously drive the elevator through chain 120.

The suction, or vacuum, system of the harvester is defined by the suction tubes 42, the rotor 40, the suction duct 55, the entry chamber 57, the intermediate chamber 58, and the blower chamber 59. When the engine is started, the fan in the blower chamber blows air out the discharge duct 83. The only other openings in the suction system are the six suction openings 46a, 46b, 46c, 46d, 46e and 46f at the ends of the suction tubes. Consequently, when the fan is rotating to discharge air out duct 83, air is drawn into the system through the six suction openings and circulated through the system for discharge out duct 83.

As the harvesting machine moves along a longitudinal path, such as the straight linear path 180 (FIGS. 12A to 12F and 13), the rotor 40 rotates about a central axis of rotation B (which continuously intersects path 180) to move the suction tubes 42, and the openings 46a, 46b, 46c, 46d, 46e, 46f thereof in orbital paths around axis B. Although the openings at the ends of the six suction tubes move in the same circular path about axis B with respect to the machine, the paths of the openings 46a to 46f over the ground are all different with respect to the ground because the axis B is advancing with respect to the ground as the rotor rotates. Each of the FIGS. 12A to 12F show the path of one suction opening with respect to the same two points P and Q fixed on the ground and with respect to the same linear path 180 followed by the axis B of the rotor. Considering the path of only one of the suction openings, say opening 46a, the magnitude of the area of ground covered in relation to the small size of the opening in a single pass of the machine should be noted. Although, with six small suction openings, the suction at each will be less than if there were only one opening, there will be six times the area of ground covered at any instant as with only one opening. The six orbiting suction openings will move in overlapping paths, as can be seen from FIG. 13 (which shows the paths of all the openings) and nuts which may not be picked up when first encountered by one suction tube, will probably be collected by a subsequent tube or tubes. It should be noted that a nut at point P will be encountered by four suction openings (46b, 46c, 46e and 46f) while a nut at point Q will be encountered by at least five of the openings 46a to 46e.

Debris, including twigs, leaves, dirt, and small stones, will inevitably be sucked up into the harvester with the nuts. The nuts and debris will pass through the rotor 40, suction duct 55, into entry chamber 57. As shown best in FIGS. 2 and 5, the nuts and heavier objects of debris will be centrifugally thrown to the outer side of the scroll-shaped chamber as the nuts and debris are drawn to the opening 64 into the intermediate chamber. As the nuts and debris are pulled into the intermediate chamber by the suction created throughout the suction system by the blower fan, the nuts and other heavier articles drop over the lip 181 at the bottom of opening 64 into the rotating valve.

The blower draws air from the intermediate chamber through the central opening 79 in the wall 70, creating a vortex in that chamber circulating around the baffle plate 78 therein. The leaves and outer light debris drawn into the intermediate chamber are caught up in the vortex in the chamber and are drawn along a helical path, indicated by arrows 182 in FIG. 5, through opening 79 into the blower chamber. This debris is discharged from the blower chamber through duct 83 to the atmosphere.

The nuts and other heavy debris, which fell into rotary valve 72 pass through the vacuum sealing valve onto the upper run of web 105 of conveyor 100. The nuts and smaller debris fall through the upper run and drop partially through the lower run onto a grate 107. Larger debris, such as twigs, is carried out of the machine to the ground by the upper run of the conveyor while the nuts and smaller debris is carried in the opposite direction to well 109 in the grate by the lower run of the conveyor. The grate 107 retains the nuts but passes the dirt and other small debris to the ground. The nuts are scooped out of the well by the buckets 119 of elevator 110 and dumped into bag 190.

Thus, a harvesting machine is provided which pneumatically gathers nuts in a wide swath on each pass of the machine and provides successive, overlapping coverage in the swath. Three separate, effective, separations of the nuts from debris are provided in the machine, including a centrifugal separation and two sizing separations (that is, two separations based on the relative size of the nuts and the debris).

Although the best mode contemplated for carrying out the present invention has been herein shown and described, it will be apparent that modification and variation may be made without departing from what is regarded to be the subject matter of the invention.

Having completed a detailed description of the invention so that those skilled in the art could practice the same, I claim:

1. In a machine for harvesting randomly dispersed nuts or the like from the ground, said machine movable along a longitudinal path, the combination comprising a plurality of suction tubes depending from the machine and terminating close to the ground, means to move the ends of said suction tubes in different orbital paths over the ground as the machine moves along said longitudinal path, and means to receive articles drawn through said suction tubes.

2. In a machine for harvesting randomly dispersed nuts or the like from the ground, said machine having a frame spaced from the ground and movable along a longitudinal path, the combination comprising a rotor mounted on the frame and rotatable thereon about an axis, a plurality of suction tubes connected to the rotor and depending in angularly spaced relation therefrom, said suction tubes terminating close to the ground for orbital movement about said axis in different paths with respect to the ground as said machine moves along said longitudinal path, and means connected to the rotor to receive articles drawn through said suction tubes.

3. In a machine for harvesting randomly dispersed nuts or the like from the ground, said machine having a frame spaced from the ground and movable along a longitudinal path, the combination comprising a rotor mounted on the frame and rotatable thereon about an axis, said rotor having a chamber, means to evacuate air from said chamber, a plurality of tubes connected to said rotor and depending therefrom in angularly spaced relation about said axis, said tubes communicating with said chamber and defining suction members terminating close to the ground for orbital movement about said axis in overlapping paths with respect to the ground as the machine moves along said longitudinal path, and means connected to the chamber in the rotor to receive articles drawn up said suction tubes.

4. The apparatus of claim 3 in which the means to evacuate air from said chamber comprises a centrifugal blower having a housing and a closed passage extending between said rotor chamber and said blower housing.

5. The apparatus of claim 3 in which said tubes extend outwardly and downwardly from said rotor.

6. The apparatus of claim 4 in which the ends of said tubes are vertically movable and in which each tube has a roller connected to the end thereof to hold the end of the tube a predetermined distance above the ground as the machine moves over uneven terrain.

References Cited

UNITED STATES PATENTS

| | | | |
|---|---|---|---|
| 2,502,810 | 4/1950 | Waters | 56—328 |
| 2,593,625 | 4/1952 | Stokes | 56—328 |
| 2,781,625 | 2/1957 | Phelps et al. | 56—328 |
| 2,807,128 | 9/1957 | Helfrich | 56—328 |
| 3,040,366 | 6/1962 | Vance. | |
| 3,182,437 | 5/1965 | Ramacher et al. | 56—328 |

LOUIS G. MANCENE, Primary Examiner

J. N. ESKOVITZ, Assistant Examiner

U.S. Cl. X.R.

15—340

PO-1050
(5/69)

UNITED STATES PATENT OFFICE
CERTIFICATE OF CORRECTION

Patent No. 3,520,123   Dated July 14, 1970

Inventor(s)   J.M. PATTERSON

It is certified that error appears in the above-identified patent and that said Letters Patent are hereby corrected as shown below:

Column 2, line 23 - change "degris" to --debris--.
Column 3, line 7 - delete "16" at the end of the line.
Column 4, line 43 - change "theeron" to --thereon--.
Column 7, line 47 - after "machine" insert --in angularly spaced relation therefrom --.

Signed and sealed this 31st day of August 1971.

(SEAL)
Attest:

EDWARD M. FLETCHER, JR.
Attesting Officer

ROBERT GOTTSCHLAK
Acting Commissioner of Patents